United States Patent
Aikyo (10) Patent No.: US 11,952,067 B2
(45) Date of Patent: Apr. 9, 2024

(54) AIRBAG DEVICE FOR SADDLE-TYPE VEHICLES

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 789 days.

(21) Appl. No.: 17/048,936

(22) PCT Filed: Apr. 27, 2018

(86) PCT No.: PCT/JP2018/017243
§ 371 (c)(1),
(2) Date: Oct. 19, 2020

(87) PCT Pub. No.: WO2019/207780
PCT Pub. Date: Oct. 31, 2019

(65) Prior Publication Data
US 2021/0171146 A1   Jun. 10, 2021

(51) Int. Cl.
*B62J 27/20* (2020.01)
(52) U.S. Cl.
CPC ..................... *B62J 27/20* (2020.02)
(58) Field of Classification Search
CPC .................. B62J 27/20; B62K 21/00
See application file for complete search history.

(56) References Cited

U.S. PATENT DOCUMENTS

| 6,846,009 B2* | 1/2005 | Kuroe ............... B62J 27/20 180/219 |
| 2003/0132616 A1 | 7/2003 | Yanagibashi et al. |
| 2004/0017066 A1 | 1/2004 | Kuroe et al. |
| 2004/0251664 A1 | 12/2004 | Miyata |
| 2011/0233906 A1* | 9/2011 | Ogawa ............... B60R 21/0132 280/735 |
| 2011/0309602 A1* | 12/2011 | Kuroe ............... B62J 27/20 280/728.3 |
| 2021/0146868 A1* | 5/2021 | Sato ............... B62J 17/04 |
| 2021/0171145 A1* | 6/2021 | Kuroki ............... B60R 21/20 |

(Continued)

FOREIGN PATENT DOCUMENTS

| CN | 104816775 B | 2/2018 |
| EP | 1338479 A1 | 8/2003 |

(Continued)

OTHER PUBLICATIONS

European Search Report dated Mar. 9, 2021, 8 pages.
(Continued)

*Primary Examiner* — Paul N Dickson
*Assistant Examiner* — Shams Dhanani
(74) *Attorney, Agent, or Firm* — Rankin, Hill & Clark LLP (57) ABSTRACT

An airbag device for saddle-type vehicles including: an inflator; an airbag adapted to be expanded by gas discharged from the inflator; and a retainer accommodating the airbag, in which the inflator and the retainer are disposed as separate members. The retainer is provided on a turning axis of a handle stem in a side view of a vehicle, the inflator 53 provided around a head pipe in a top view of the vehicle, and the retainer and the inflator are coupled to each other with a connection tube.

20 Claims, 6 Drawing Sheets

(56) References Cited

U.S. PATENT DOCUMENTS

| | | | | |
|---|---|---|---|---|
| 2021/0171146 A1* | 6/2021 | Aikyo | ................... | B62J 27/20 |
| 2023/0127760 A1* | 4/2023 | Sato | ................... | B62J 27/20 |
| | | | | 280/728.2 |
| 2023/0150599 A1* | 5/2023 | Sato | ................... | B62J 27/20 |
| | | | | 280/736 |

FOREIGN PATENT DOCUMENTS

| | | |
|---|---|---|
| JP | H08-301031 | 11/1996 |
| JP | 2003-104159 | 4/2003 |
| JP | 2003-104262 | 4/2003 |
| JP | 2003-237662 | 8/2003 |
| JP | 2003-285787 | 10/2003 |
| JP | 2005-001507 | 1/2005 |
| JP | 2010-228677 | 10/2010 |

OTHER PUBLICATIONS

International Search Report, dated Jul. 17, 2018, 2 pages.
Written Opinion of the International Searching Authority dated Jul. 17, 2018 filed in PCT/JP2018/017243, 4 pages.
Taiwanese Office Action dated Nov. 8, 2019, 5 pages.
International Preliminary Examination Report dated May 27, 2020, 18 pages.
Indonesian Office Action with English translation dated Jan. 21, 2022, 5 pages.
International Preliminary Report on Patentability dated Oct. 29, 2020, 5 pages.
Japanese Office Action dated Nov. 30, 2021 from corresponding application JP 2020515443, with English translation, 7 pages.
European Office Action dated Nov. 25, 2021 from corresponding application EP 18916593.9, 5 pages.
Indian Office Action dated Jul. 30, 2021, 6 pages.

* cited by examiner

AIRBAG DEVICE FOR SADDLE-TYPE VEHICLES

TECHNICAL FIELD

The present invention relates to an airbag device for saddle-type vehicles.

BACKGROUND ART

In the related art, an airbag device for saddle-type vehicles in which an airbag retainer accommodating a folded airbag and an inflator adapted to generate gas for causing the airbag to expand are separately disposed is known.

Also, an airbag device in which a sectioning plate is provided at a midpoint inside a pipe member configuring a part of a vehicle body frame and a gas path for guiding gas generated by an inflator into an airbag unit is directly formed is disclosed (Patent Literature 1, for example).

Also, an airbag device in which an inflator and a retainer accommodating an airbag are separated and a gas supply path on a side closer to the inflator is connected to a portion of the retainer facing an opening portion of the airbag is disclosed (Patent Literature 2, for example).

CITATION LIST

Patent Literature

[Patent Literature 1] Japanese Patent Laid-Open No. 2003-104262
[Patent Literature 2] Japanese Patent Laid-Open No. 08-301031

SUMMARY OF INVENTION

Technical Problem

The airbag device disclosed in Patent Literature 1 requires working inside a main frame, and working of the frame is complicated.

Incidentally, for an airbag device for saddle-type vehicles, it is desirable to compactly dispose the airbag device and to deploy the airbag vertically upward to the maximum extent for appropriately protecting passengers.

The present invention was made in view of the aforementioned circumstances, and an object thereof is to enable, in an airbag device for saddle-type vehicle, simple configuration of the airbag device, compact disposition thereof, and deployment vertically upward of an airbag.

Solution to Problem

According to the present invention, there is provided an airbag device for saddle-type vehicles including: inflator (53); an airbag (52) adapted to be expanded by gas discharged from the inflator (53); and a retainer (52a) accommodating the airbag (52), in which the airbag device has a handle stem (20a) attached to a head pipe (4) so as to be able to turn, the inflator (53) and the retainer (52a) are disposed as separate members, the retainer (52a) is provided on a turning axis (L) of a handle stem (20a) in a side view of a vehicle, the inflator (53) is provided around the head pipe (14) in a top view of the vehicle, and the retainer (52a) and the inflator (53) are coupled to each other with a gas path (51).

Also, in the aspect of the present invention, the retainer (52a) may be provided between grip portions (23g) of a handle (23) in a plan view of the vehicle.

Also, in the aspect of the present invention, the gas path (51) may be provided to bridge an upper portion of the head pipe (14) from a vicinity of the head pipe (14).

Also, in the aspect of the present invention, the gas path (51) may be provided to bridge an upper portion of the head pipe (14) from a side portion of the head pipe (14).

Also, in the aspect of the present invention, the gas path (54c) may be provided to bridge an upper portion of the head pipe (14) from a front portion of the head pipe (14).

Also, in the aspect of the present invention, the gas path (54c) may be provided to bridge an upper portion of the head pipe (14) from a rear portion of the head pipe (14).

Advantageous Effects of Invention

The airbag device for saddle-type vehicles according to the present invention includes: the inflator; the airbag adapted to be expanded by gas discharged from the inflator; and the retainer accommodating the airbag, the inflator and the retainer are disposed as separate members, the retainer is provided on a turning axis of the handle stem in a side view of the vehicle, the inflator is provided around the head pipe in a top view of the vehicle, and the retainer and the inflator are coupled to each other with the gas path.

With this configuration, it is possible to dispose the airbag device using a space between components of the vehicle by providing the retainer and the inflator as separate members, to realize space saving for the airbag device, and to compactly dispose the airbag device. Also, it is possible to deploy the airbag in the vertical direction when the airbag is deployed upward. Also, it is possible to simply configure the airbag device.

Also, in the aforementioned configuration, the retainer may be provided between grip portions of the handle in a plan view of the vehicle.

With this configuration, it is possible to deploy the airbag using the space between the grips of the handle and to improve a degree of freedom in designing the airbag.

Also, in the aforementioned configuration, the gas path may be provided to bridge the upper portion of the head pipe from the vicinity of the head pipe.

With this configuration, it is possible to dispose the gas path around the head pipe and to shorten the length of the gas path. In this manner, it is possible to reduce the amount of gas required to deploy the airbag and a time required for the deployment.

Also, in the aforementioned configuration, the gas path may be provided to bridge the upper portion of the head pipe from the side portion of the head pipe.

With this configuration, it is possible to dispose the gas path on a side of the head pipe and to shorten the length of the gas path. In this manner, it is possible to reduce the amount of gas required to deploy the airbag and a time required for the deployment.

Also, in the aforementioned configuration, the gas path may be provided to bridge the upper portion of the head pipe from the front portion of the head pipe.

With this configuration, it is possible to dispose the gas path in front of the head pipe and to shorten the length of the gas path. In this manner, it is possible to reduce the amount of gas required to deploy the airbag and to reduce a time required for the deployment.

Also, in the aforementioned configuration, the gas path may be provided to bridge the upper portion of the head pipe from the rear portion of the head pipe.

With this configuration, it is possible to dispose the gas path behind the head pipe and to shorten the length of the gas path. In this manner, it is possible to reduce the amount of gas required to deploy the airbag and to reduce a time required for the deployment.

DESCRIPTION OF EMBODIMENT

Hereinafter, embodiments of the present invention will be described with reference to drawings. Note that notation of directions such as front, rear, left, right, upper, and lower in the description are assumed to be the same as those relative to a vehicle body unless particularly indicated otherwise. Also, the reference sign FR in each drawing represents the front side of the vehicle, and the reference sign UP represents the upper side of the vehicle.

Figure 1:
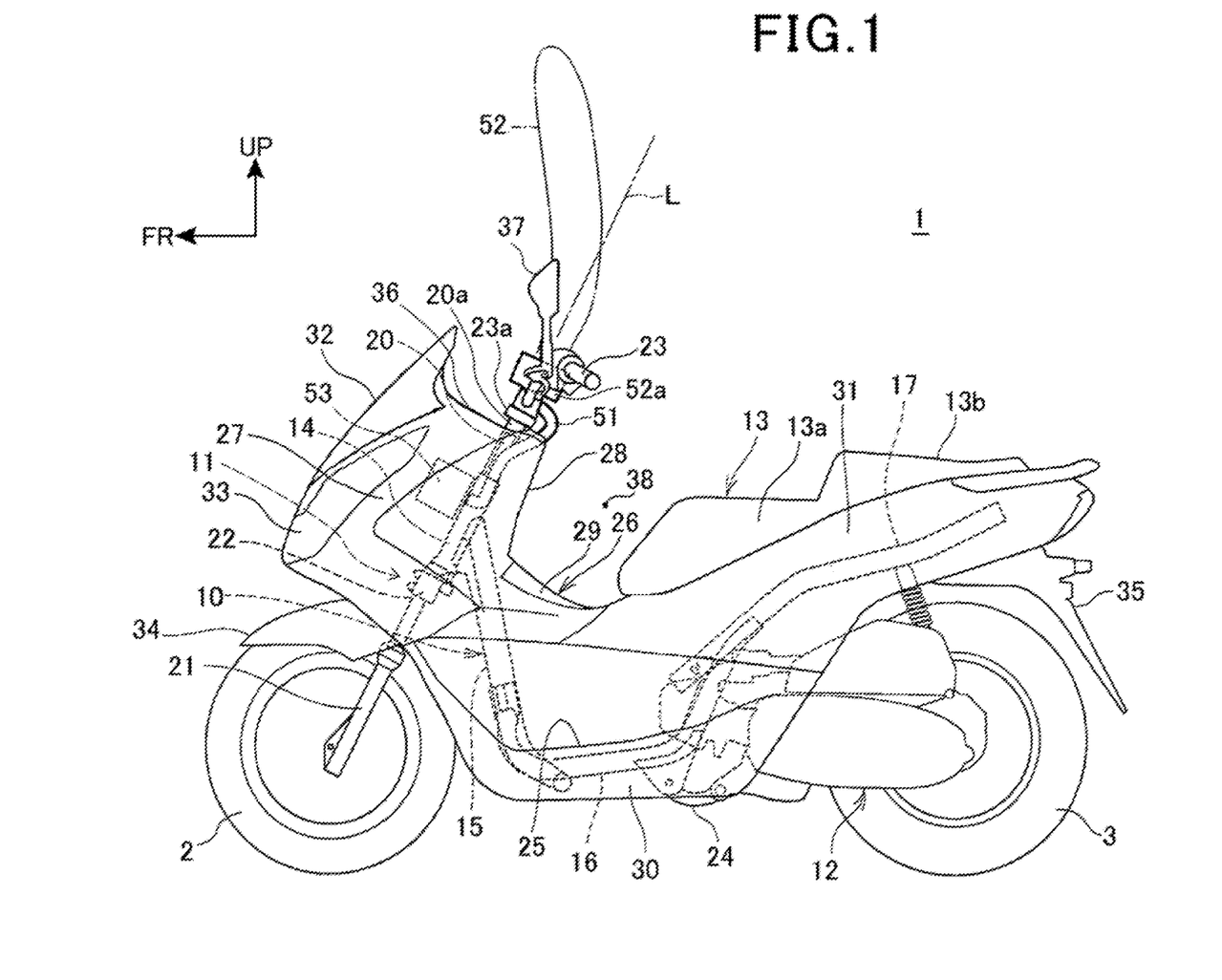
FIG. 1 is a left side view of a motorcycle provided with an airbag device according to a first embodiment of the present invention.

FIG. 1 is a left side view of a motorcycle 1 provided with an airbag device according to a first embodiment of the present invention. FIG. 1 illustrates a state in which an airbag 52 that will be described later has been expanded and deployed. Note that for components provided as pairs on the left and right sides, only components on the left side including reference signs are illustrated in FIG. 1.

The motorcycle 1 is a scooter-type saddle-type vehicle provided with a vehicle body frame 10, a steering system 11 adapted to support a front wheel 2 in a steerable manner, a power unit 12 supported at a rear portion of the vehicle body frame 10, a rear wheel 3, and a seat 13 in which a passenger is seated in a straddling manner.

The vehicle body frame 10 includes a head pipe 14 provided at a front end of the vehicle body frame 10, a main frame 15 extending from the head pipe 14 toward the rear lower side, and a pair of left and right lower frames 16, 16 extending backward from a lower end portion of the main frame 15. Further, the vehicle body frame 10 includes a pair of left and right rear frames 17, 17 extending backward from the lower frames 16, 16 toward the rear upper side. The head pipe 14 is disposed at the center of the vehicle width similarly to the front wheel 2.

The steering system 11 includes a steering shaft 20 pivotally supported at the head pipe 14 and a pair of left and right front forks 21, 21 disposed on both left and right sides of the front wheel 2 to support the front wheel 2. Also, the steering system 11 further includes a bridge member 22 secured to a lower end of the steering shaft 20 to couple upper portions of the left and right front forks 21, 21 and a handle 23 secured to an upper end of the steering shaft 20. The handle 23 for steering is connected to the steering shaft 20 via a handle post 23a secured to the upper end of the steering shaft 20.

The head pipe 14 is inclined backward relative to the vertical direction by an amount of a predetermined caster angle set in the motorcycle 1 in a side view of the vehicle. The steering shaft 20 is inserted into and pivotally supported by the head pipe 14 and is disposed to foe inclined backward in a side view of the vehicle.

The power unit 12 is a unit swing engine provided with functions of an engine as a drive source for the rear wheel 3 and a swing arm supporting the rear wheel 3. The power unit 12 is pivotally supported by the vehicle body frame 10 so as to be freely swingable via a link member 24 provided at a front end portion of the power unit 12.

The seat 13 is provided above the rear frame 17. The seat 13 includes a front-side seat 13a in which a driver is seated and a rear-side seat 13b in which a fellow passenger is seated, in an integrated manner.

A pair of left and right step floors 25, 25 on which the driver places his/her left and right feet are provided on the front lower side of the front-side seat 13a.

The motorcycle 1 includes a vehicle body cover 26 adapted to cover the vehicle body such as the vehicle body frame 10.

The vehicle body cover 26 includes a front cover 27 adapted to cover upper portions of the head pipe 14 and the steering system 11 from the front side and from the left and right sides and an inner cover 28 continued from a rear edge of the front cover 27 and adapted to cover the upper portions of the head pipe 14 and the steering system 11 from the rear side.

Also, the vehicle body cover 26 includes a center cover 29 located on the front lower side of the front-side seat 13a and an undercover 30 covering the vehicle body from the lower side below the step floors 25, 25. Also, the vehicle body cover 26 further includes a rear-side cover 31 covering the rear frames 17, 17 from sides below the seat 13.

A wind screen 32 inclined toward the rear upper side in a side view of the vehicle is attached to an upper portion of the front cover 27. A headlight 33 is provided in a front surface of the front cover 27.

The motorcycle 1 includes a front fender 34 and a rear fender 35.

A meter 36 adapted to display information regarding the motorcycle 1 such as a vehicle speed is disposed in front of the handle 23. A rear-view mirror 37 is attached to the handle 23.

A front portion of the center cover 29 is continued from a lower portion of the inner cover 28. The center cover 29 is located inside left and right legs of the driver stretched from the front-side seat 13a to the step floors 25, 25.

A straddled space 38 recessed downward is sectioned by the inner cover 28, the center cover 25, and the front surface of the front-side seat 13a in a side view of the vehicle. The passenger can straddle the motorcycle 1 via the straddled space 38 when the passenger rides on and gets off the motorcycle 1.

The motorcycle 1 includes an airbag device 50 adapted to protect the passenger from impact. An inflator 53 of the airbag device 50 is disposed between the head pipe 14 and the front cover 27 in a side view of the vehicle. Also, a retainer 52a of the airbag device 50 is located on an axial center L of the head pipe 14 that serves as a turning axis of a handle stem 20a in a side view of the vehicle.

Figure 2:
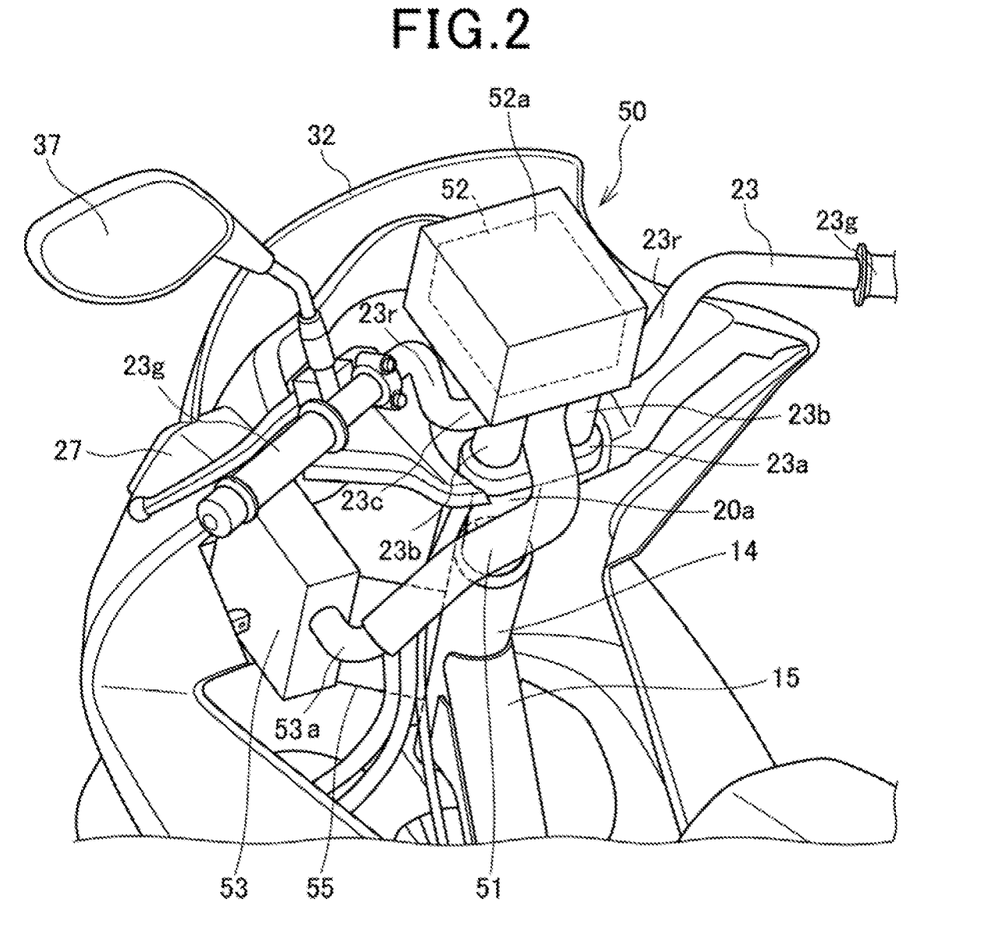
FIG. 2 is a perspective view of a peripheral portion of a handle when seen from an upper side.

Next, the airbag device 50 will be described using FIGS. 2 and 3.

The airbag device 50 is configured of the airbag 52, the retainer 52a, the inflator 53, and a connection tube 51.

Note that the inflator 53 is connected to a control unit (not illustrated) of the motorcycle 1, and an acceleration sensor (not illustrated) is connected to the control unit.

The airbag 52 is accommodated in the retainer 52a in a folded state. The inflator 53 is adapted to generate gas for causing the airbag 52 to expand. The retainer 52a and the inflator 53 are connected to each other with the connection tube 51. Also, gas generated in the inflator 53 is supplied to the airbag 52 inside the retainer 52a via the connection tube 51 to cause the airbag 52 to expand.

Note that the connection tube 51 is configured of a flexible pressure-resistant tube. Also, a connection tube 51 adapted to be deformed in a case in which the pressure therein steeply increases is used. The connection tube 51 may be configured of an airbag base cloth.

The retainer 52a is disposed above the handle stem 20a. The handle stem 20a is secured to the steering shaft 20 so as to be not able to relatively turn, in a state in which the upper end of the steering shaft 20 inserted into the head pipe 14 is inserted thereinto. In this manner, the steering shaft 20 turns around the axial center L of the head pipe 14 that serves as a turning center, along with the handle stem 20a in response to an operation of turning the handle 23.

The handle post 23a is attached to an upper end of the handle stem 20a, and two handle holders 23b are provided in an upper surface of the handle post 23a in an aligned manner in the left-right, direction of the vehicle. Also, the retainer 52a is attached to the handle holders 23b.

The handle holders 23b are adapted to hold the handle 23, and a center portion 23c of the handle 23 is held by the two handle holders 23b. The handle 23 is configured of the center portion 23c, rising portions 23r extending toward the upper and the outer side on both left and right sides of the center portion 23c, and grip portions 23g each extending in the outer direction of the vehicle from the upper portions of the rising portions 23r.

The retainer 52a is attached to the upper portions of the handle holders 23b and is disposed between the rising portions 23r of the handle 23. Also, an upper end of the connection tube 51 is connected to the lower surface of the retainer 52a, and the connection tube 51 is configured to pass between the handle holders 23b.

The connection tube 51 extends toward the lower and rear side from the lower surface of the retainer 52a and extends downward and in the left-side direction of the vehicle below the handle post 23a. The inflator 53 is disposed on the left side of the head pipe 14, and the connection tube 51 is connected to a connection pipe 53a of the inflator 53. The connection tube 51 is connected to the inflator 53 by inserting the connection pipe 53a into the lower end thereof.

Thus, the connection tube 51 is disposed along the head pipe 14 and the handle stem 20a to bridge the upper portion of the head pipe 14 from the vicinity (from a side portion in this embodiment) of the head pipe 14.

The connection pipe 53a is provided in a rear surface of the inflator 53 in the front-back direction of the vehicle, and a rear end of the connection pipe 53a is directed toward the upper portion of the head pipe 14. In other words, the connection pipe 53a extends backward from the inflator 53 and thereafter extends inward of the vehicle and upward.

The inflator 53 is attached to the head pipe 14 via a stay 55, and the stay 55 extends obliquely forward in a plan view of the vehicle beyond the head pipe 14. Also, the inflator 53 is attached to a front end portion of the stay 55.

The inflator 53 is disposed in the vicinity of the head pipe 14 and is disposed inside the vehicle beyond the outer surface of the front cover 27. Also, the inflator 53 is located on the left side of the head pipe 14 in the left-right direction of the vehicle. Note that a key cylinder and a handle locking mechanism (not illustrated) are provided on the right side of the head pipe 14.

Figure 3:
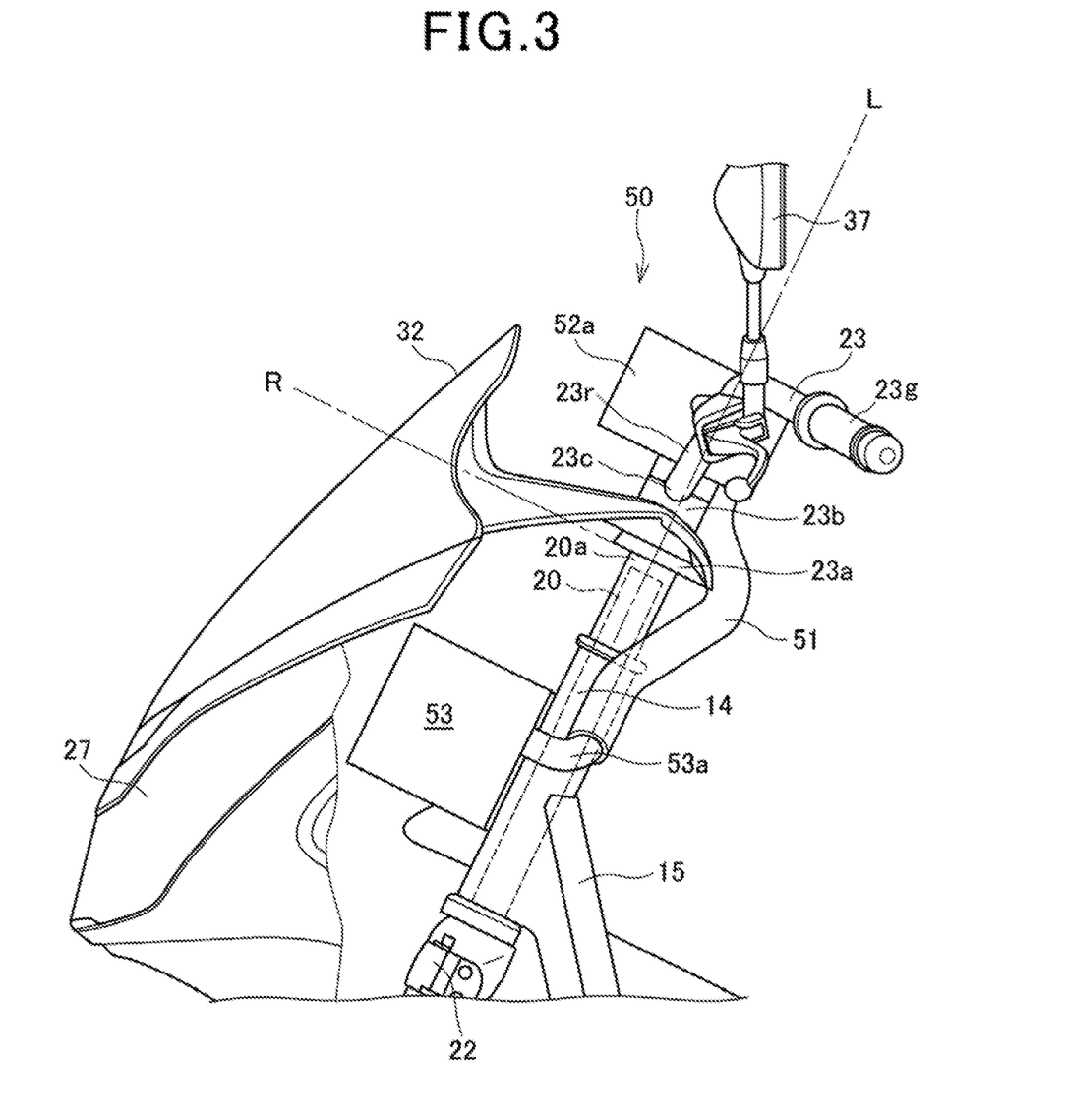
FIG. 3 is a left side view of the peripheral portion of the handle.

Also, the inflator 53 passes through the upper end of the head pipe 14 in front of the head pipe 14 and located below a plane R that perpendicularly intersects the turning axis of the handle stem 20a in a side view of the vehicle, as illustrated in FIG. 3. In addition, the connection pipe 53a is provided at a location at which the connection pipe 53a overlaps the head pipe 14 in a side view of the vehicle.

The connection tube 51 connecting the connection pipe 53a to the retainer 52a is configured to have specific slack or loosening in a state in which the handle 23 is held in a straight traveling direction.

Next, effects of the first, embodiment of the present invention with the aforementioned configuration will be described.

First, effects of the airbag device 50 illustrated in FIGS. 1 to 4 will be described.

In a case in which the acceleration sensor (not illustrated) of the motorcycle 1 detects an acceleration that is equal to or greater than a predetermined value, the control unit (not illustrated) operates the inflator 53. In this manner, the inflator 53 generates gas.

The gas generated by the inflator 53 Is supplied to the airbag 52 in the retainer 52a via the connection pipe 53a and the connection tube 51.

Then, the airbag 52 is expanded by the gas that has flowed thereinto, and the airbag 52 cleaves a part of the retainer 52a and is deployed upward beyond the retainer 52a. Also, the impact generated when the airbag 52 is deployed are received by the head pipe 14 via the retainer 52a, the handle holder 23b, the handle post 23a, and the handle stem 20a.

Figure 4:
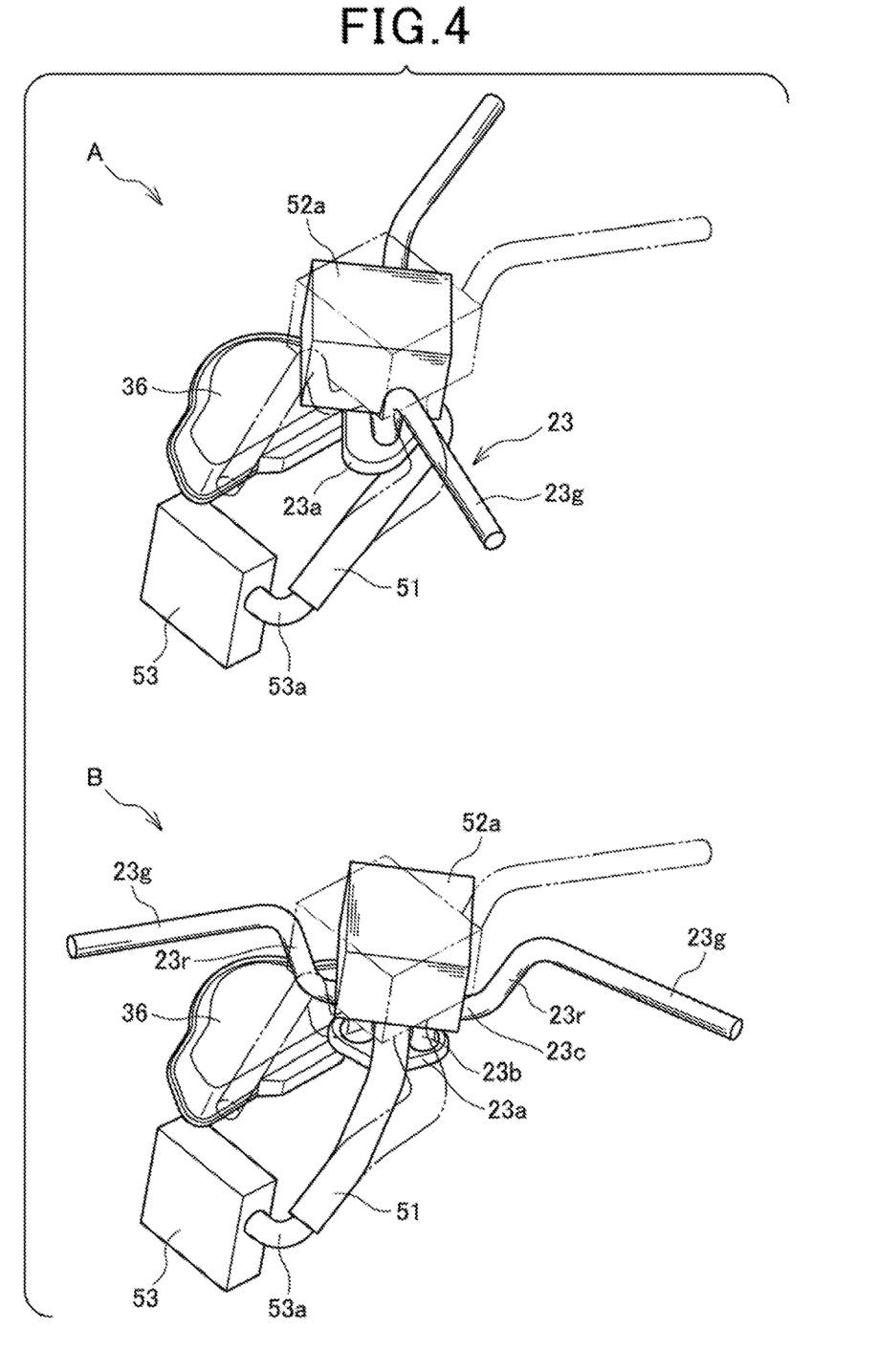
FIG. 4 is a diagram illustrating a state of an inflator and a retainer when the handle is turned.

FIG. 4 is a diagram illustrating a state of the inflator and the retainer when the handle is turned.

In FIG. 4, the state A is a state in which the handle 23 has been turned left, and the state B is a state in which the handle 23 has been turned right. Note that in the state A and in the state B, the handle 23 is in a state in which the handle 23 has been turned up to its limit, and the maximum turning range of the handle 23 is restricted by a handle stopper (not illustrated) provided between the bridge member 22 and the main frame 15.

Also, the handle 23, the retainer 52a, and the connection tube 51 in a state in which the handle 23 is not turned in the state A and in the state B are represented by two-dotted dashed lines.

In a case in which the handle 23 is turned left in the state A, the upper end of the connection tube 51 is pulled to the right by the handle holder 23b provided on the left side of the vehicle. Also, the connection tube 51 is connected to the connection pipe 53a from the lower surface of the retainer 52a through the lower side of the handle post 23a, the handle stem 20a, and the vicinity of the side surface of the head pipe 14.

The connection tube 51 is provided with slack or loosening, and motion of the handle 23 is not restricted even in a case in which the handle 23 is turned to the limit.

In this manner, even when the inflator 53 is disposed on the left side of the head pipe 14, the slack or loosening of the connection tube 51 prevents the left turning of the handle 23 from being inhibited.

When the handle 23 is turned right in the state B, the connection tube 51 between the handle holders 23b moves to the left, where the inflator 53 is disposed. In this case, only the amount of slack or loosening of the connection tube 51 increases, and the connection tube 51 does not restrict the turning of the handle 23. Also, since the connection pipe 53a inserted into the lower end of the connection tube 51 extends toward the upper portion of the head pipe 14, even when the connection tube 51 is loosened (i.e., slack increases), the loosened portion is directed toward the side of the head pipe 14.

In this manner, the connection tube 51 does not affect operations of the handle 23 in the state A and in the state B. Also, since the inflator 53 and the retainer 52a are connected to each other with the connection tube 51, the airbag device 50 can operate even in a state in which the handle has been turned.

Also, since the connection tube 51 follows the periphery of the head pipe 14 even in a case in which the handle 23 has been turned, it is possible to reduce a space in which the connection tube 51 moves.

Also, since the retainer 52a is disposed above the handle stem 20a and on the axial center L of the head pipe 14 that is the turning axis of the handle stem 20a, the retainer 52a is present on the axial center L even when the handle 23 is turned.

In other words, the position of the retainer 52a does not change even when the retainer 52a rotates, in the state A and in the state B. It is thus possible to deploy the airbag 52 above the handle stem 20a regardless of the turning of the handle 23.

Further, since the inflator 53 and the retainer 52a are provided as separate members, the retainer 52a accommodating the airbag 52 is disposed above the handle holder 23b. In this manner, the upper surface of the retainer 52a is disposed at a lower position as compared with a case in which the inflator 53 and the retainer 52a are disposed in an integrated manner.

Since the airbag 52 is disposed above the handle holder 23b and between the grip portions 23g of the handle 23 on the upper side of the handle stem 20a, it is possible to deploy the airbag 52 from a location that is close to the upper body of the passenger of the motorcycle 1. In this manner, it is possible to compactly configure the airbag 52 and to reduce the volume inside the airbag 52. Also, it is possible to reduce the amount of gas required for the deployment and to compactly configure the retainer 52a. Further, it is possible to shorten the time required for the deployment.

As described above, according to the embodiment to which the present invention is applied, the airbag device for the motorcycle 1 includes the inflator 53, the airbag 52 adapted to be expanded by gas discharged from the inflator 53, and the retainer 52a accommodating the airbag 52. Also, the inflator 53 and the retainer are disposed as separate members, and the retainer 52a is provided on the axial center L that is a turning axis of the handle stem 20a in a side view of the motorcycle 1. Also, the inflator 53 is provided around the head pipe 14 in a view, and the retainer 52a and the inflator 53 are coupled to each other with the connection tube 51 (gas path).

With this configuration, since the retainer 52a and the inflator 53 are provided as separate members, one integrated space is not needed for the disposition. Also, it is possible to dispose the retainer 52a and the inflator 53 using a space between other components and to realize space saving for the airbag device 50.

Also, it is possible to deploy the airbag 52 in the vertical direction when the airbag 52 is deployed. Since an opened space on the turning axis of the handle stem 20a is used in the motorcycle 1, it is possible to deploy the airbag 52 in the vertical direction. By deploying the airbag 52 in the vertical direction in front of the upper body of the driver, it is possible to extend a time until the driver is brought into contact with the airbag 52 at the time of collision and to extend a time required until the deployment of the airbag 52 is completed. In this time, it is possible to improve a degree of freedom in designing the deployable airbag.

Since the space on the turning axis of the handle stem 20a is used as a space for viewing the meter 36, and the retainer 52a is disposed on the turning axis of the handle stem 20a, it is possible to reduce the region that blocks the sight of the driver as compared with the case of the disposition along with the inflator 53. In this manner, it is possible to dispose the airbag 52 near the upper body of the driver while securing the sight required for driving.

Also, since the impact generated when the airbag 52 is deployed is received by the head pipe 14 connected to the main frame 15 the orientation of the retainer 52a is unlikely to deviate, and the airbag 52 can be deployed upward.

Also, the retainer 52a is provided between the grip portions 23g of the handle 23 in a plan view of the vehicle.

With this configuration, it is possible to deploy the airbag 52 using the space between the grip portions 23g of the handle 23 and to improve a degree of freedom in designing the airbag 52.

Also, in a case in which a brake is applied to the front wheel 2, the handle 23 is returned to the straight traveling position, and it is thus possible to deploy the airbag 52 in front of the driver.

Also, the connection tube 51 is provided to bridge the upper portion of the head pipe 14 from the vicinity of the head pipe 14.

With this configuration, it is possible to dispose the connection tube 51 around the head pipe 14 and to shorten the length of the connection tube 51. In this manner, it is possible to reduce the amount of gas required to deploy the airbag 52 and a time required for the deployment. Also, It is possible to shorten the connection tube 51 and thereby to reduce the weight of the airbag device 50.

Next, a second embodiment of the present invention will be described.

Figure 5:
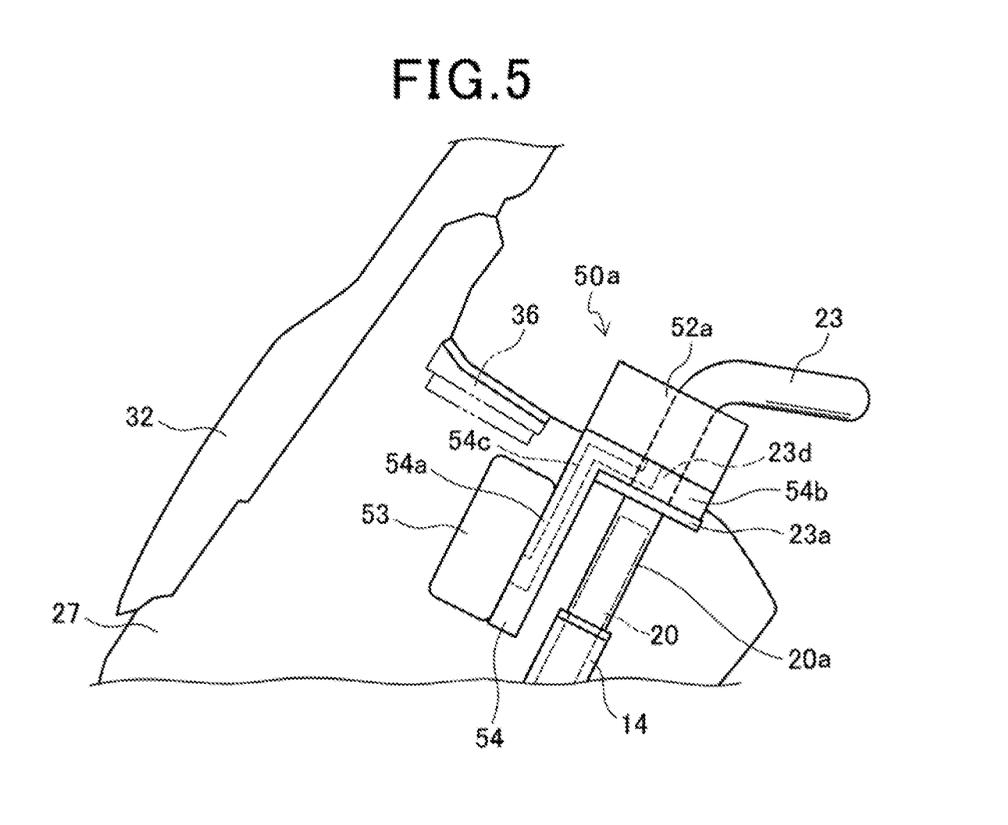
FIG. 5 is a left side view illustrating a configuration in which an inflator is disposed in front of a head pipe according to a second embodiment of the present invention.
Figure 6:
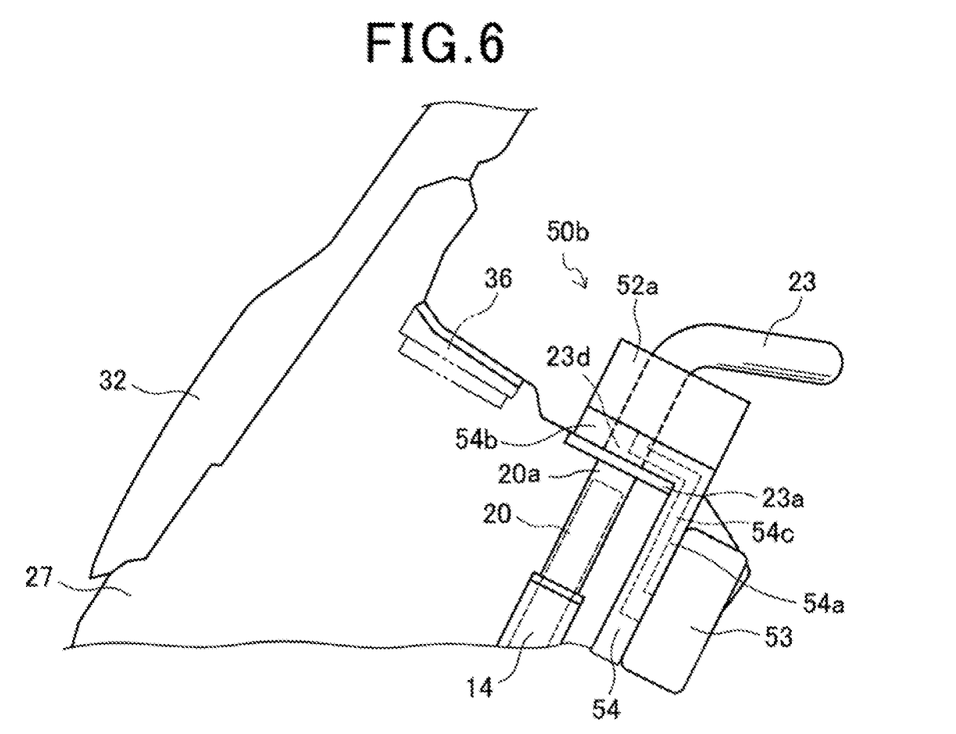
FIG. 6 is a left side view illustrating a configuration in which the inflator is disposed behind the head pipe according to the second embodiment of the present invention.

FIG. 5 is a left, side view illustrating a configuration in which an inflator is disposed in front of a head pipe according to the second embodiment of the present invention, and FIG. 6 is a left side view illustrating a configuration in which the inflator is disposed behind the head pipe according to the second embodiment of the present invention.

In the configuration illustrated in FIG. 5, an inflator 53 and a retainer 52a are provided as separate members and are connected to each other via a gas path portion 54.

The gas path portion 54 is adapted to supply gas generated by the inflator 53 into the retainer 52a, and the gas flows into the airbag 52 inside the retainer 52a. The airbag 52 then expands.

The gas path portion 54 is attached to a handle post 23a. The gas path portion 54 is configured to have an inverted L shape in a side view and is configured of a lower portion 54a extending downward and an upper portion 54b attached to the handle post 23a.

In addition, a gas path 54c is provided inside the gas path portion 54, and the gas is supplied from the inflator 53 to the retainer 52a via the gas path 54c.

The lower portion 54a of the gas path portion 54 extends toward the front and obliquely lower side from the front of the handle post 23a in parallel with a handle stem 20a. Also, the inflator 53 is attached to the front surface of the lower portion 54a. In addition, the lower end of the inflator 53 is disposed in accordance with the lower end of the lower portion 54a and is disposed in a space below the meter 36 in a state in which handles 23 are not turned. In this manner, the inflator 53 is disposed around the head pipe 14 and in front of the head pipe 14.

Also, the upper portion 54b of the gas path portion 54 extends along a plane that perpendicularly intersects a turning axis of the handle stem 20a, and the retainer 52a is attached to the upper surface of the upper portion 54b.

The lower surface of the upper portion 54b of the gas path portion 54 is attached to the upper surface of the handle post 23a, and the left and right handles 23 are attached to the handle post 23a with the upper portion 54b interposed therebetween. Lower ends 23d of the left and right handles 23 are configured to be fixedly provided at the handle post 23a and turn integrally with the handle post 23a.

Also, the upper portion 54b of the gas path portion 54 is disposed between the lower ends 23d of the left and right handles 23, and the retainer 52a is disposed between the left and right handles 23.

In this manner, the gas path portion 54 is provided to bridge the upper portion of the head pipe 14 from the vicinity (the front portion in the configuration illustrated in FIG. 5) of the head pipe 14.

In the configuration illustrated in FIG. 6, the inflator 53 and the retainer 52a are provided as separate members and are connected to each other via a gas path portion 54.

Also, similarly to the configuration illustrated in FIG. 5, the inflator 53 and the retainer 52a are connected to each other with the gas path portion 54.

The gas path portion 54 is attached to the handle post 23a, and the gas path portion 54 is configured in the inverted L shape in a side view. In addition, the gas path portion 54 is configured of the lower portion 54a extending downward and the upper portion 54b attached to the handle post 23a.

The lower portion 54a of the gas path portion 54 extends toward the front and obliquely lower side from the back of the handle post 23a in parallel with the handle stem 20a. Also, the inflator 53 is attached to the rear surface of the lower portion 54a. In this manner, the inflator 53 is disposed around the head pipe 14 and behind the head pipe 14.

The upper portion 54b of the gas path portion 54 extends along the plane that perpendicularly intersects the turning axis of the handle stem 20a, and the retainer 52a is attached to the upper surface of the upper portion 54b.

In the configuration illustrated in FIG. 6, the upper portion 54b of the gas path portion 54 is disposed between the left and right handles 23 similarly to the configuration illustrated in FIG. 5. In addition, the retainer 52a is disposed on the upper surface of the upper portion 54b of the gas path portion 54. In this manner, the retainer 52a is disposed between the left and right handles 23.

Also, the gas path portion 54 is provided to bridge the upper portion of the head pipe 14 from the vicinity (from the rear portion in the configuration illustrated in FIG. 6) of the head pipe 14.

Next, effects of the configurations illustrated in FIGS. 5 and 6 of the airbag device according to the second embodiment will be described.

First, effects of the airbag device 50a illustrated in FIG. 5 will be described.

In a case in which the handles 23 are turned, the inflator 53 and the retainer 52a turn along with the handles 23. Therefore, the inflator 53 and the retainer 52a do not inhibit motion of the handles 23, and the retainer 52a is located on the turning axis of the handle stem 20a even when the handles 23 are turned.

The load of the airbag device 50a is supported by the head pipe 14 via the handle post 23a and the handle stem 20a, and operations of the handles 23 are less affected.

Also, since the inflator 53 is disposed around the head pipe 14, and the retainer 52a is disposed between the handles 23, the distance between the inflator 53 and the retainer 52a is shortened. Further, since a clearance is provided between the rear surface of the lower portion 54a of the gas path portion 54 and the handle stem 20a, a space through which wirings for switches attached to the handle 23 are made to pass is configured.

Further, since the inflator 53 is disposed in front of the handle stem 20a, the upper surface of the retainer 52a is disposed at a lower position as compared with a case in which the inflator 53 and the retainer 52a are disposed in an integrated manner.

In addition, in a case in which the inflator 53 operates, the gas generated by the inflator 53 passes through the gas path 54c provided inside the gas path portion 54 and is supplied to the airbag 52 inside the retainer 52a. The airbag 52 inside the retainer 52a is expanded by the gas that has flowed thereinto. In this manner, the airbag 52 cleaves a part of the retainer 52a and is deployed toward the rear upper side beyond the retainer 52a.

In the airbag device 50b illustrated in FIG. 6 as well, the inflator 53 and the retainer 52a do not inhibit motion of the handle 23, and the retainer 52a is located on the turning axis of the handle stem 20a even when the handle 23 is turned.

The gas path portion 54 extends toward the front lower side in parallel with the handle stem 20a while being brought into contact with the rear portion of the handle post 23a. Thus, a large space can be provided inside the front cover 27 in front of the handle stem 20a and the head pipe 14.

Operations of the airbag device 50b is similar to the aforementioned airbag device 50a, and the gas generated by the inflator 53 passes through the gas path 54c and is supplied to the airbag 52 inside the retainer 52a. The airbag 52 cracks the retainer 52a and is deployed toward the rear upper side beyond the retainer 52a.

Since the inflator 53 is provided around the head pipe 14 and behind the head pipe 14, it is possible to dispose the airbag device 50b without affecting configurations of wirings and the like inside the front cover 27.

Also, although the motorcycle 1 has been described as an example of the saddle-type vehicles in the aforementioned embodiments, the present invention is not limited thereto, and the present invention can be applied to a three-wheel saddle-type vehicle provided with two front wheels or rear wheels or a saddle-type vehicle provided with four or more wheels.

REFERENCE SIGNS LIST

1 Motorcycle
14 Head pipe
15 Main frame
20 Steering shaft
20a Handle stem
22 Bridge member 23 Handle
23a Handle post
23b Handle holder
23c Center portion
23d Lower end
23g Grip portion
23r Rising portion
27 Front cover
32 Wind screen
50 Airbag device
50a Airbag device
50b Airbag device
51 Connection tube
52 Airbag
52a Retainer
53 Inflator
53a Connection pipe
54 Gas path portion
54a Lower portion
54b Upper portion
54c Gas path
55 Stay

The invention claimed is:

1. An airbag device for saddle-type vehicles comprising:
an inflator;
an airbag adapted to be expanded by gas discharged from the inflator; and
a retainer accommodating the airbag,
wherein the airbag device has a handle stem attached to a head pipe so as to be able to turn,
the inflator and the retainer are disposed as separate members,
the inflator is disposed between the head pipe and a front cover in a side view of a vehicle, and is attached to the head pipe via a stay,
the retainer is provided on a turning axis of a handle stem in the side view of the vehicle, and is attached to a handle holder that holds a handle,
the retainer and the inflator are coupled to each other with a gas path, and
the gas path is provided with a sufficient amount of slack or loosening so as to not restrict movement of the handle when turning the handle.

2. The airbag device for saddle-type vehicles according to claim 1,
wherein the retainer is provided between grip portions of the handle in a plan view of the vehicle.

3. The airbag device for saddle-type vehicles according to claim 1,
wherein the gas path is provided to bridge an upper portion of the head pipe from a vicinity of the head pipe.

4. The airbag device for saddle-type vehicles according to claim 3,
wherein the gas path is provided to bridge an upper portion of the head pipe from a side portion of the head pipe.

5. The airbag device for saddle-type vehicles according to claim 3,
wherein the gas path is provided to bridge an upper portion of the head pipe from a front portion of the head pipe.

6. The airbag device for saddle-type vehicles according to claim 3,
wherein the gas pipe is provided to bridge an upper portion of the head pipe from a rear portion of the head pipe.

7. The airbag device for saddle-type vehicles according to claim 2,
wherein the gas path is provided to bridge an upper portion of the head pipe from a vicinity of the head pipe.

8. The airbag device for saddle-type vehicles according to claim 7,
wherein the gas path is provided to bridge an upper portion of the head pipe from a side portion of the head pipe.

9. The airbag device for saddle-type vehicles according to claim 7,
wherein the gas path is provided to bridge an upper portion of the head pipe from a front portion of the head pipe.

10. The airbag device for saddle-type vehicles according to claim 7,
wherein the gas pipe is provided to bridge an upper portion of the head pipe from a rear portion of the head pipe.

11. The airbag device for sale-type vehicles according to claim 1,
wherein the inflator is attached to a side of the head pipe, and the retainer is attached to a side of the handle stem.

12. The airbag device for sale-type vehicles according to claim 2,
wherein the inflator is attached to a side of the head pipe, and the retainer is attached to a side of the handle stem.

13. The airbag device for sale-type vehicles according to claim 3,
wherein the inflator is attached to a side of the head pipe, and the retainer is attached to a side of the handle stem.

14. The airbag device for sale-type vehicles according to claim 4,
wherein the inflator is attached to a side of the head pipe, and the retainer is attached to a side of the handle stem.

15. The airbag device for sale-type vehicles according to claim 5,
wherein the inflator is attached to a side of the head pipe, and the retainer is attached to a side of the handle stem.

16. The airbag device for sale-type vehicles according to claim 6,
wherein the inflator is attached to a side of the head pipe, and the retainer is attached to a side of the handle stem.

17. The airbag device for sale-type vehicles according to claim 7,
wherein the inflator is attached to a side of the head pipe, and the retainer is attached to a side of the handle stem.

18. The airbag device for sale-type vehicles according to claim 8,
wherein the inflator is attached to a side of the head pipe, and the retainer is attached to a side of the handle stem.

19. The airbag device for sale-type vehicles according to claim 9,
wherein the inflator is attached to a side of the head pipe, and the retainer is attached to a side of the handle stem.

20. The airbag device for sale-type vehicles according to claim 10,
wherein the inflator is attached to a side of the head pipe, and the retainer is attached to a side of the handle stem.

* * * * *